Figure 1:
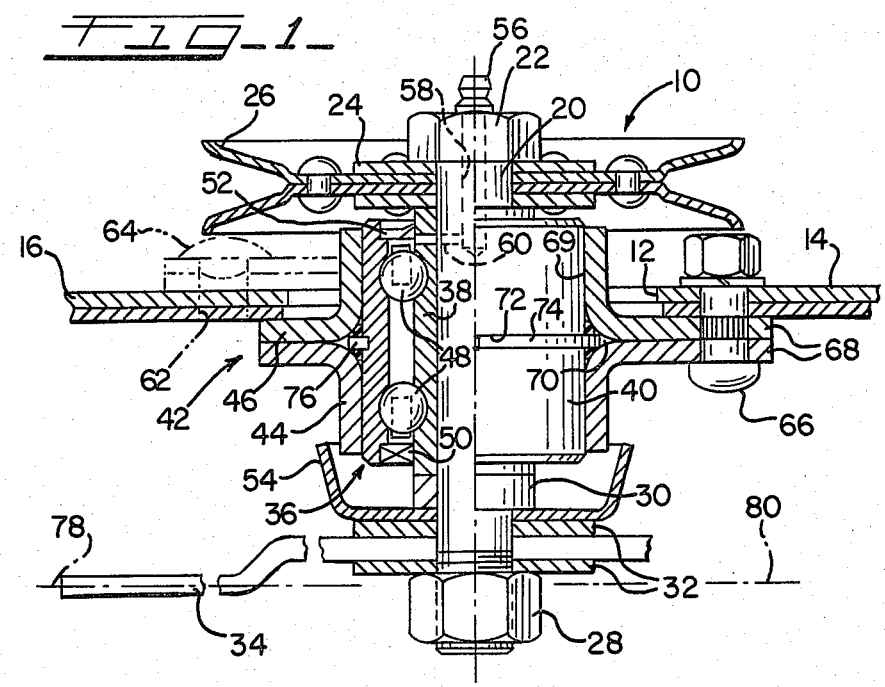

United States Patent [19]

Kocian

[11] 4,366,995

[45] Jan. 4, 1983

[54] MOWER DRIVE WITH YIELDABLE SPINDLE MOUNT

[75] Inventor: Frank A. Kocian, Frankfort, Ill.

[73] Assignee: Federal-Mogul Corporation, Detroit, Mich.

[21] Appl. No.: 269,063

[22] PCT Filed: Jan. 26, 1981

[86] PCT No.: PCT/US81/00114

§ 371 Date: Jan. 26, 1981

§ 102(e) Date: Jan. 26, 1981

[51] Int. Cl.³ .......................................... F16C 27/04
[52] U.S. Cl. .................................. 308/26; 308/184 R;
308/189 R; 308/236; 29/149.5 R
[58] Field of Search ............... 308/26, 184 R, 189 R,
308/236, 189 A, 190

[56] References Cited

U.S. PATENT DOCUMENTS

| 2,740,673 | 4/1956 | Guy | 308/28 |
| 3,844,630 | 10/1974 | Lechner | 308/184 |
| 4,089,569 | 5/1978 | Rempel | 308/184 R |
| 4,138,168 | 2/1979 | Herlitzek | 308/236 |

Primary Examiner—Lenard A. Footland
Attorney, Agent, or Firm—Robert F. Hess

[57] ABSTRACT

This invention relates to an arbor assembly for a bearing spindle which presents thereto a multi-row of rolling bearing elements with an inherent moment fixing the spindle axis against tilting and, under constraint of that moment, supporting the spindle for anti-frictional high speed rotation. The assembly includes bearing retaining ring means and elastomer preloaded thereagainst providing yieldability in the spindle mounting, especially adapting it for use in a cutterbar drive to mow weeds, lawns and the like.

12 Claims, 6 Drawing Figures

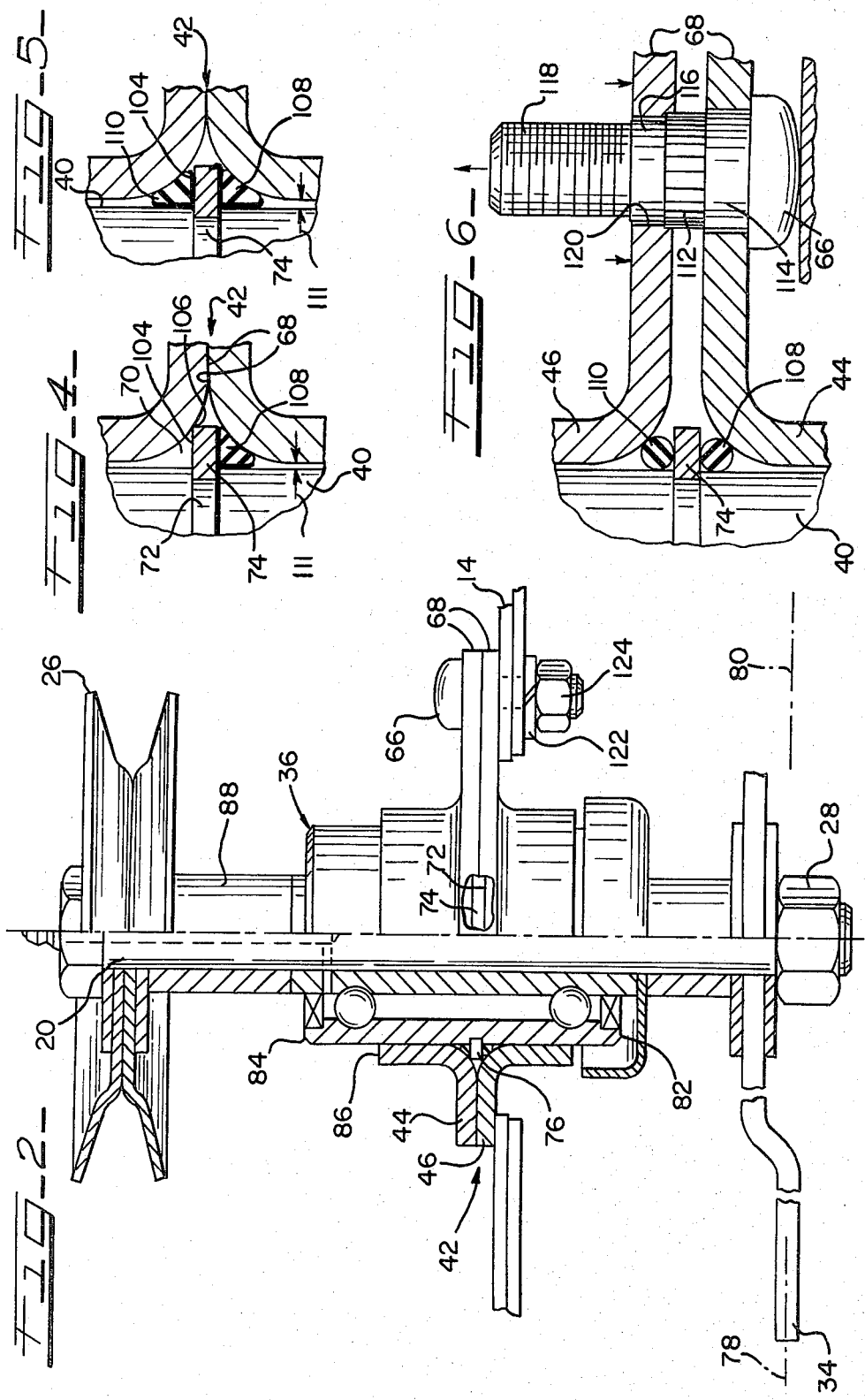

MOWER DRIVE WITH YIELDABLE SPINDLE MOUNT

This invention relates to an arbor assembly for a bearing spindle which presents thereto a multi-row of rolling bearing elements with an inherent moment fixing the spindle axis against tilting and, under constraint of that moment, supporting the spindle for anti-frictional high-speed rotation. The assembly includes bearing retaining ring means and elastomer pre-loaded thereagainst providing yieldability in the spindle mounting, especially adapting it for use in a cutterbar drive to mow weeds, lawns, and the like. Shock loads, which are thus better accommodated, are common because of obstructions encountered in mowing.

Made of record, relevant to background, are U.S. Pat. Nos. 2,277,635, 3,584,923, 4,065,190 and 4,193,310. Especially made of record are U.S. Pat. No. 2,938,754 disclosing a bipartite bearing sleeve and a bearing member splined therein for slidable movement yet kept fluid tight thereto by two diametrically divided, tapered seals of relevance, and U.S. Pat. Nos. 2,923,580 and 3,382,015 disclosing an outer bearing member having a retaining ring groove thereabout and secured in a bore by a snap ring of relevance.

It is an object of the invention that a single snap ring be utilized on the outside of a spindle bearing of the multi-row type, fitted in a complementary receiving groove thereabout and solely providing the bearing retaining ring means or collar or locating shoulder necessary.

An object in line with the foregoing objective is to provide for ready adaptability of the design to a multiplicity of applications by merely placing the snap ring groove in a slightly different longitudinal position on the outside of the bearing, whereby the spindle in the bearing can be longitudinally located to suit the installation. Or, several snap ring grooves cut in the outside of a more universal single fixed design of bearing will allow the bearing and a mount therefor of fixed design to serve several different installations each requiring a different cutting height and each requiring use of a different one of the parallel grooves for occupancy by the single ring employed.

It a further object of the invention to employ a highly versatile mount suitably open at both ends of its bearing receiving bore, thus allowing placement of the bearing and spindle longitudinally as desired according to the precise placement of the snap ring groove and the snap ring confined within the mount bore.

Another object is to provide a mount of sheet metal construction, bipartite in design because symmetrically formed by two identical or practically identical bore defining halves presenting confronting mounting flanges to one another.

An additional object is forming such two halves from bent sheet metal which, at their inner juncture where the mounting flanges confront, defines inside the sheet metal a cusp-shaped space to receive the retaining ring when the bearing is longitudinally in place therein.

Another object, materializing with the provision of elastomeric material intervening in the cusp space at one or both sides of the retaining ring between it and the mount halves, is to enable the bearing mount within itself to act as an axial shock-load absorber and/or act as a noise supressor so important to arbor assemblies to be utilized in mower blade and fan installations. A related object when the mounting flanges of the mount halves are brought together, is to thereby compressively preload the elastomeric material thus removing the axial/radial looseness inherent in the entire assembly which would otherwise permit movement or vibration from regular forces and result in earlier deterioration; nevertheless, the bearing within the mount, because of the elastomer, remains free to readily shift in absorbing undue axial shock stress.

A further object resides in unitizing the entire assembly simply by permanently fastening together the mount halves through their confronting mounting flanges, whereby a self-contained arbor assembly results, readily merchandiseable by units as replacement items in substitution for some unit in existing machinery as a simple modular replacement. They also serve as spare or original parts.

Another object in the incorporation of fasteners to the mounting flanges is to employ serrated bolts which not only provide mounting means for installing the arbor assembly as original or replacement equipment, but which also in the very act of fastening, fasten their serrated teeth permanently in place and thus fasten the assembly permanently together for ease in later handling as a unitized stock item.

Figure 3:
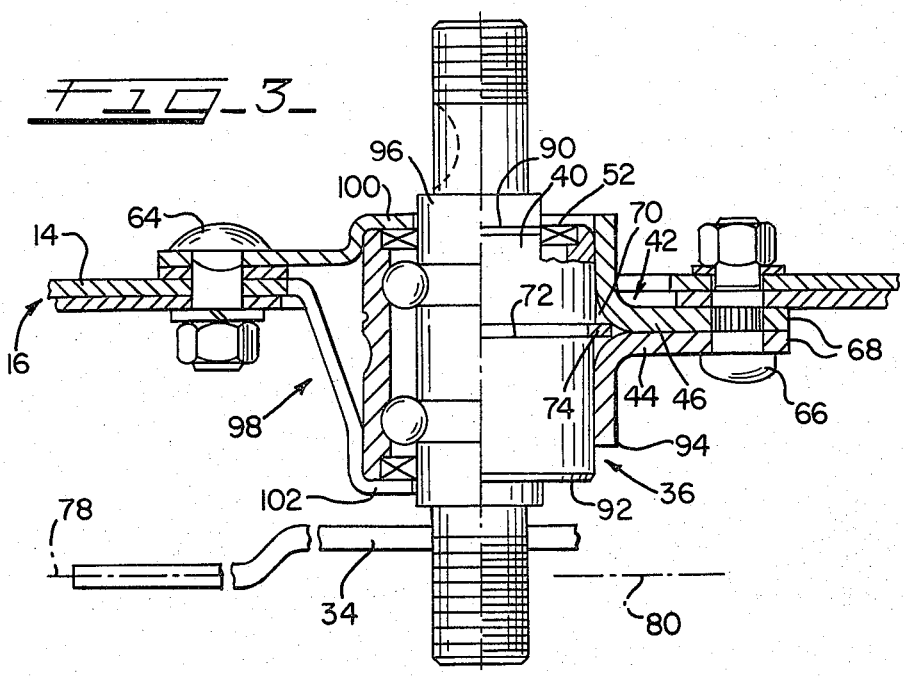

Further features, objects and advantages will either be specifically pointed out or become apparent when, for a better understanding of the invention, reference is made to the following written description taken in conjunction with the accompanying drawings which show certain preferred embodiments thereof and in which:

FIG. 1 is an elevational view partially in section of an arbor assembly embodying the present invention;

FIGS. 2 and 3 similarly are partly sectioned views, but showing respectively an upraised and an underslung modification of the invention;

FIGS. 4 and 5 are elevational details to enlarged scale of isolation mount embodiments incorporating therein compressed elastomer preloading the assembly and inherently preloaded with assembly; and FIG. 6 is a similar elevational detail of the embodiment of FIG. 5 undergoing final assembly.

More particularly in the drawings, a bolt-thru arbor assembly 10 employed in a mower drive is shown in FIG. 1 installed in the arbor or spindle opening 12 formed in the deck 14 of a mower housing 16. A vertically disposed thru-bolt 20 has a head 22 clamping to the top of the rotating parts of the assembly the hub 24 of a driving element consisting of a stamped, sheet metal sheave 26 driven by an engine driven V-belt, not shown.

The bolt 20 has threads at the bottom carrying a nut 28 clamping to the rotating parts of the assembly a spacer 30, a pair of cutter hub washers 32, and a conventional mower cutterbar 34 sandwiched between the washers 32. A multi-row anti-friction bearing 36 has an inner race 38 clamped between the sheave hub 24 and spacer 30 at top and bottom, respectively, and receives in its complementary bore the bolt 20. The complementary bore of the inner race 38 is circular, hexagonal, or otherwise square in cross-section depending upon the corresponding outside shape in cross-section of the bolt 20 which could be round as illustrated or could be a hexagonal, square or other shaped spindle or shaft.

The assembly necessarily has fixed parts including an outer race 40 of the bearing and a bipartite mount 42 formed of flanged bent halves 44 and 46 of stamped sheet metal which are not necessarily made, but which for paramount economic reasons can be made practically alike, as illustrated, or else be made exactly symmetrically and identically to one another.

The multi-row arrangement of rolling elements between the inner and outer race members of the bearing, which could be rollers if desired, are illustrated in their actual preferred form as a double row of ball bearings 48 which are protected by respective lower and upper multi lip seals 50, 52. The lower seal 50 is in turn protected by a rotating, cup shaped shroud 54 clamped to the rotating parts between the spacer 30 and adjacent cutter hub washer 32.

The provision of the head 22 on the thru-bolt and its location afford, for bearing relubrication purposes, a very desirable upper site and an adequate body of metal to readily receive a valve type or Zerk grease fitting 56 having a direct connection to the inter-race annular space in the bearing common to the seals and the rows of balls 48. That connection provides at one end a longitudinal bolt passage 58 leading to the fitting 56, and at the other end provides an intersecting radial passage 60 in the bolt leading to the long, longitudinally extending bearing space referred to containing the balls 48.

The mower deck 14, which is horizontally disposed, carries a ring of vertically disposed bolt holes 62 surrounding the deck opening 12. The holes 62 receive one form of screw and nut fastener 64 or another form of fastener 66 as preferred. The flanged mount halves 44, 46 carry three or more radially extending companion attachment wings 68 exactly corresponding in number to the holes 62 and presenting corresponding registering fastener openings underlying same in this particular undermounting arbor assembly 10 as illustrated. The fasteners of the form 64 or 66 provide the attachment.

The outside of the outer bearing race 40 presents a uniform, smooth cylindrical surface for bearing 36, and a cylindrical bore 69 in the mount 42 is complementary thereto in receiving same, except for an included cusp shaped retaining ring space 70 between the bearing and the adjacent bent portions of the bent sheet metal halves 44, 46. A continuous ring groove 72 in the outside surface of the bearing has a gapped ring 74 gapped at 76 and mutually received by the groove and by the retaining ring closed space 70. The gapped ring used is a spring steel device known as a snap ring and is of the self retaining common type as generally shown in expired U.S. Pat. No. 2,923,580.

In the arrangement illustrated in FIG. 1, the bearing 36 according to design projects freely at opposite ends through the unrestricted open ended mount 42 by an equal amount beyond the corresponding ends of the mount halves 44, 46, and anti-frictionally supports the bar 34 with its horizontal cutter plane 78 precisely at the level of the cutting plane 80 designed for. Therefore by design, the placement of the annular ring groove 72 falls equidistantly between the ends of the bearing 36, and the latter are in a parallel relationship with the plane of the groove.

In the FIG. 2 showing of a top mounted arbor assembly providing an upraised arrangement, like parts to the parts in FIG. 1 are identified by like reference numerals.

For use as a strict replacement unitized assembly, the arbor assembly as shown in FIG. 2 may not work out to be high enough in an existing installation even when the fasteners 66 are reversed as shown and the halves 44, 46 exchange places vertically so that the attachment wings 68 carried thereby can properly be made to overlie the corresponding bolt holes shown in the mower deck 14.

For proper accommodation therefore, the placement in common of the ring 74 and its continuous groove 72 in the bearing is made appreciably closer to the bottom end 82 of the bearing whereby the top end 84 projects relatively higher and protrudes farther out of the corresponding end 86 of the mount 42 than does the lesser-protruding bottom end 82. The ring and groove are at right angles to the bearing axis.

With such adaptability, the arbor design appearing in FIG. 2 achieves the desired result that the cutter plane 78 has an elevated position falling right at the level of the plane 80 designed for.

Adaptability of the design is further manifested in connection with the stamped steel sheave 26 which is elevated to the proper design height on the arbor assembly by means of a long intervening spacer sleeve 88 surrounding the thru-bolt 20 about an upper section of the latter.

Like numerals are similarly applied to like parts present in the additional modification of the invention as shown in FIG. 3. This modification is an under-mounting arbor assembly which is underslung and of the integral shaft type.

More particularly, the retaining ring groove 72 on the bearing outer race 40 is solely occupied by the gapped snap ring 74 and so is the closed annular cusp-shaped space 70 occupied thereby. The bent portions of the mount halves 44, 46 are so proportioned and located that, when the attachment wings 68 are pressed flush firmly together on final assembly, the outer corners of the ring 74 will be contacted under compression but will resist by biting slightly into the confronting metal of the halves 44, 46.

The placement of the retaining ring 74 and its receiving groove 72 has an upward offset placing them comparitively close to the top end 90 of the double row ball bearing 36, and so the bottom end 92 of the bearing is made relatively lower and actually protrudes from the corresponding end 94 of the bearing mount 42. The open ended mount 42, symmetrical, internally retains the top end 90 of the bearing recessed somewhat from the end of the bore through the mount. This adaptability enables the integral or combined spindle and inner race structure 96 to carry the cutterbar so that its cutting plane 78 will reach down to and precisely coincide with the plane 80 at cutter design level.

Not only does the unrestrictedly open ended mount 42 provide the necessary adaptability for the bearing bottom end 92 to protrude, but also the mount by being not closed off provides complete access to the bearing upper seal 52. So for relubrication purposes in such instances as where the so-called permanently lubricated cartridge bearings are used, especially in those cases where the seal 52 is made of felt, a quantity of make-up lubricant can readily be introduced inside through the expedient of a hypodermic or hypodermic-like lubricant needle. With felt type seals the needle will be inserted through the body of the felt and withdrawn therefrom leaving no hole and without damage thereto, whereas with lip type seals the needle can be inserted merely under the lips which will elastically return into sealing engagement with the sealed metal surface when the needle is withdrawn.

It is evident that bolt thru spindle assemblies can also be used in an underslung arrangement, whereas integral shaft assemblies can equally well be adapted for undermounting at lower or higher levels or a top mounting for an upraised level of the cutting plane.

In FIG. 3 as viewed at the left for comparison purposes, a conventional closed ended bearing mount 98 shown secured by conventional fasteners 64 has unsymmetrical stampings presenting the customary upper and lower blocking flanges 100, 102 which trap and fix the position of the bearing outer member at its opposite ends. No adaptability exists for longitudinal adjustment or for relubrication other than by changing the design.

In the modification of FIG. 4, the ring 74 because of its spring construction locks itself tightly seated in the bottom of the receiving groove 72 of the outer bearing member 40. At one side 104 the ring at its outer corner bites slightly at its point of ring contact 106 into the confronting metal surface of the sheet metal mount 42.

At the ring's opposite side, a preloaded ring of elastomer 108 is held permanently under radial and axial compression against the outer race 40 and ring 74 by the mount 42 after the attachment wings 68 of the latter are forced together as illustrated in final assembly.

In FIG. 4, it will be noted that axially from the side 104 of ring 74 and also axially from the elastomer side of the ring, the annular space 70 merges into a diametral or total clearance space 111 between outer race 40 and the bore of the mount 42 to provide a ready assembly fit for ease of manufacture. The specific fit is known as a touch fit, calling in the example of various ones of designs made, so far, for a total clearance which averages diametrically about 0.003", (0.008 cm) between the extreme limits of 0.000 and 0.006" total tolerance specified in these illustrative examples.

So there is no radial or axial looseness allowed in the bearing which is retained tight in the mount during minor vibrations encountered. But this not-normally loose retaining joint reacts differently to vibrations of greater magnitude and, obviously, to the shock of impacts. Thus when the spindle, not shown, has its axis very forcibly tilted, the ring 74 can allow slight pivoting movement of the assembly thereabout with the ring acting as fulcrum. The bore clearance 111 prevents binding and affords the latitude for such movement.

A shock force with an axial component on the spindle, not shown, will allow the ring corner at its side 104 to move away from the ring of contact 106, affording to the outer race 40 movement about the elastomer 108 as isolator both longitudinally and slightly laterally in the bore of the mount 42. Again, there is no binding because of the clearance space 111.

FIG. 5 shows a modification with complete isolation by elastomer for both directions of yieldability. Not only is the elastomer side of the bearing retaining ring restrained radially and axially by the bent stamping mount 42 through the preloaded ring of elastomer 108, but also the side 104 of the ring is similarly preloaded by an interposed ring of elastomer 110 compressed by the mount for respectively axially and radially loading the ring and outer race 40 of the bearing.

Preparatory to assembly, either or both sides of the snap ring 74 could have the rings of elastomer 108, 110 bonded or otherwise pre-attached securely thereto.

Preferably according to the showing of FIG. 6, the annuli of elastomer 108, 110 are simply commercial O-rings fitted from opposite ends of the outer bearing member 40 so that they make contact with and straddle the ring 74 therebetween. As they intervene, the gap they form eliminates a path of metal-to-metal contact.

Therefollowing, and again from opposite ends of the bearing, the respective identical mount halves 44, 46 are introduced by touch fit and brought into contact with the respective O-rings 108, 110. The final press in the assembly centers around the preferred type of special fastener 66 which is a particular serrated bolt.

And more particularly as shown to enlarged scale in FIG. 6, the serrated bolt 66 has an intermediate serrated section 112 integrally between a free fitting cylindrical bolt hole section 116 of smaller diameter and a cylindrical smooth so-called head section 114 adjacent the bolt head and freely fitting within and coextensive in length with the bolt accommodating, fairly large fastener opening in the adjacent attachment wing 68 of the mount stamping concerned. Similarly, the reduced diameter section 116 fits freely within and is coextensive in length with the bolt hole concerned in the ring of bolt holes of the mower deck, not shown. Finally, a washer-and-nut carrying, integral, threaded extremity section 118 at the opposite end from the bolt head is used after final assembly for secure attachment of the mount to the adjacent side of the mower deck, not shown.

With the fastener head firmly held relative to the half 44 so that the fastener 66 cannot back out of the latter, the several confronting attachment wings 68 are compressed so as to bring the two halves 44, 46 into solid face to face abutment along the full area of their radial flanges. Consequently, and despite the free passage of the reduced diameter bolt hole section 116 therethrough, the intermediate serrated section 112 is irretractively forced into and permanently distorts the registering flange hole 120 of the confronting mounting half 46 to afford a stressed locus of deflected metal in the hole locking together permanently the bipartite metal mount. Thereupon, the unitized arbor assembly is installed in the arbor spindle opening of the mower deck, with the threaded extremity sections of the fasteners 66 protruding through the ring of bolt openings and receiving the required washers and nuts for secure attachment to the mower housing, not shown. The serrated fasteners cannot turn as the nuts are tightened down.

When the serrations each press their way into a constricted registering flange opening 120 as in FIG. 6 under relative, major-interference-fit motion as indicated by the oppositely directed arrows illustrated, portions of the smaller-diameter opening metal actually grow radially inwardly as the circular edges of the opening are cold-deformed. The reason is due to the pointed tooth shape of the serrations which appear in cross section as a continuous series of uniformly short straight zig-zag lines intersecting one another at the same acute angle and forming an uninterrupted ring of alternating sharp V-shaped ridges and grooves about the section 112. The cold-flowing hole metal bottoms down in, and interlocks with, the grooves while each ridge becomes embedded and locked in the displaced portion of the edge of the fastener opening where the encroaching ridge had divided it.

It is to be appreciated that precise technical identity between the mount halves 44 and 46 can be achieved if all fastener openings in their attachment wings are punched to the same diameter. Unitizing by pressing will be the same as before, except the leading serrated section of each fastener will cut its teeth through both mount openings in series, and the fastener head section will either be serrated with identical teeth or smoothed as a cylinder of appreciably reduced diameter.

The convenience for handling, stocking, and marketing of a unitized arbor assembly, for original or replacement use according to the invention, can readily be appreciated if, in the second embodiment illustrated for example, the cutterbar 34 is visualized as deleted from FIG. 2 and, also therefrom, the mower housing 14, a serrated bolt washer 122, and a nut 124 are likewise visualized as deleted. The serrated bolt 66 is carried by the assembly not only as the ultimate attachment fastener for top mounting or undermounting to a mower as desired, but also to establish the permanent union during final assembly holding the assembly together as one unit thereafter. The energy absorbing opposed double annuli of elastomer are readily discernable in this figure, and also the limited space formed thereby between mounting halves on the outside and the locater shoulders formed by the snap ring. The annuli fill in all gaps from manufacturing variations.

Alternately to the above, solely the assembled mount 42 and bearing 36 complete with their necessary complement of fasteners 66, washer-free and nut-free if desired that way, can easily be marketed as a single sealed cartridge bearing unit, complete in itself. The mount 42, integral type bearing 36, and fasteners 66 as shown according to FIG. 3 can readily be conceived as marketable as a cartridge bearing unit.

In either of the above cases, the already existing ring groove is at a preselected point on the bearing periphery providing for the bearing, by a predetermined amount, to project unequally or not at one of the ends compared to the other relative to the corresponding ends of the bipartite mount for an extent of axial offset or none as desired. The snap ring because it forms an unmovable solid shoulder on the bearing periphery becomes the fixed and permanent locater when the assembly is equipped therewith during the unitizing procedure; the purchaser of the cartridge bearing unit is faced with no fitting or adjustments to make when he ultimately installs the unit is machinery. For proper versatility herein prior to unitization, it is to be appreciated that the assembler can form a plurality of parallel retaining ring grooves at different preselected points providing for no offset and a variety of offsets covering any particular desired location for the bearing, and then at his discretion can insert in the particular one of the grooves desired the single snap ring. to establish the location desired of that particular bearing. In other words, one bearing and one mount of fixed design are made adaptable for installation in a variety of machinery by having a corresponding variety of pre-cut ring grooves in the bearing periphery. A range of machines with differing cutting heights can thus be accommodated.

Variations within the spirit and scope of the invention described are equally comprehended by the foregoing description.

What is claimed is:

1. Arbor assembly for attachment to a mower deck having an arbor opening and a ring of bolt openings around the arbor opening, comprising:
   an anti-friction multi-row bearing including an outer bearing member for the rows of rolling bearing elements;
   mounting halves (44, 46) to support the bearing in said opening having flange portions overlying the ring of deck bolt openings, said halves forming in said arbor opening a bipartite metal mount for the bearing and defining a closed annular space (70) thereabout;
   ring means (74) in said space suspending the bearing from its mount; and
   serrated bolts (66) each having a threaded section (118) for reception in a deck bolt opening to threadingly clamp the deck and mount together, a head section (114) engaging in a flange hole of a distal mounting half, and an intervening serrated section (112) irretractively forced into and permanently distorting a registering flange hole of a proximal mounting half to afford a stressed locus of displaced metal in the hole locking together the bipartite metal mount.

2. In unitized arbor manufacture resulting in an original or replacement unit assembly, from parts in preassembly comprising a multi-row spindle bearing to provide an inherent moment resisting tilting forces on the spindle, a ring locked to the bearing periphery, separated mount halves having a touch fit with the periphery of the bearing, adapted to form a bipartite mount therefor and straddling, in preassembly, the locked ring with integral mounting flanges turned outwardly therefrom so as to be radially disposed in the bipartite mount, fastening means including at least one serrated bolt passing through one mounting flange and having its serrations in registered confrontation to a bolt hole in the other mounting flange, the steps of manufacture including:
   forcing axially along the bearing said separated mount halves with the mounting flanges pressed in the direction of face to face contact and the locked ring pressed toward engagement by and with said halves; and
   simultaneously forcing said serrated bolt irretractively into said bolt hole (120) with the serrations (112) locking together the mounting flanges of the mount halves face to face together and the mount halves toward engagement with the locked ring respectively axially and radially in the unitized assembly with respect to the mount.

3. The invention of claim 2, wherein the locked ring one of the parts in pre-assembly comprises a single gapped snap ring of spring metal, the steps of manufacture further including:
   forming a ring groove (72) at a preselected point along the bearing periphery providing for the bearing by a predetermined amount to project unequally or not at one of the ends compared to the other relative to the corresponding ends of the bipartite mount for an extent of axial offset or none as desired in the latter; and
   inserting in said groove prior to arbor assembly the spring metal snap ring (74) so as to serve as an entirely self sustaining locked ring as the separated mount halves close thereover when their mounting flanges are being locked by the serrations face to face together.

4. In unitized arbor manufacture resulting in an original or replacement unit assembly, from parts in preassembly comprising a multi-row spindle bearing to provide an inherent moment resisting tilting forces on the spindle, a ring locked to the bearing periphery having adjacent thereto on at least one side loading ring means of elastomer, separated mount halves having a touch fit with the periphery of the bearing, adapted to form a bipartite mount therefor and straddling, in preassembly, the locked ring and elastomer with integral mounting flanges turned outwardly therefrom so as to be radially disposed in the bipartite mount, fastening means including at least one serrated bolt passing through one mounting flange and having its serrations in registered confrontation to a bolt hole in the other mounting flange, the steps of manufacture comprising:

forcing axially along the bearing periphery said separated mount halves with the mounting flanges pressed in the direction of face to face contact and the locked ring and elastomer being approached toward contact by and with said halves; and simultaneously forcing said serrated bolt irretractively into said bolt hole with the serrations (112) locking together the mounting flanges of the mount halves face to face together and preloading the elastomer yieldable against the locked ring and bearing periphery respectively axially and radially in the unitized assembly with respect to the mount so that undue axial shock energy on the spindle can be freely absorbed free of looseness developing in the unit assembly under ordinary vibrational stress.

5. The invention of claim 4 comprising the further step of:

providing to the locked ring two loading rings (108, 110) of the elastomer disposed one adjacent each side thereof and thus preloaded in assembly against the bearing periphery and locked ring to intervene in the metal-to-metal path at both sides.

6. In unitized arbor manufacture resulting in an original or replacement unit assembly, from parts in preassembly comprising a multi-row spindle bearing to provide an inherent moment resisting tilting forces on the spindle, a single retaining ring for the bearing periphery, separated mount halves having a touch fit with the periphery of the bearing, adapted to form a bipartite mount therefor and straddling, in pre-assembly, the retaining ring with integral mounting flanges turned outwardly therefrom so as to be radially disposed in the bipartite mount, and unitizing structure for the bipartite mount comprising means of permanently fastening the mounting flanges together, the steps of manufacture including:

forming a transverse ring groove (72) at a preselected point on the periphery of the bearing providing for same by a predetermined amount to project unequally or not at one of the ends compared to the other relative to the corresponding ends of the bipartite mount for an extent of axial offset or none as desired in the latter;

inserting in said groove as the aforesaid single retaining ring a single gapped snap ring (74) of spring metal so as to serve as an entirely self sustaining ring locked to the bearing periphery;

forcing axially along the bearing periphery said separated mount halves with the mounting flanges thereof pressed in the direction of face to face contact and the locked ring being approached toward contact by and with said halves; and unitizing the bipartite mount with the means of permanently fastening together the mounting flanges when they are face to face together.

7. The invention of claim 6, further including:

forming a plurality of parallel ring grooves at different preselected points providing for no offset and/or a variety of offsets covering any particular desired longitudinal location for the bearing; and inserting in the particular one of the grooves desired the single snap ring to establish the longitudinal location desired of the bearing.

8. An arbor assembly (10) having a spindle (20) journaled for rotation within a tubular bearing outer ring (40) enclosing rolling elements (48) therebetween, a bipartite retainer (42) having first and second elements (44,46) each element having an annular portion (94) and a flange portion (68) at one end of said annular portion, said flange portions being adapted to be secured together with said annular portions in axial alignment to define an opening (69) for receiving said bearing outer ring, wherein the improvement comprises:

said first and second elements (44,46) defining an annular groove (70) about the inner diameter of the flange portions of said elements;

an annular member (74) attached to said outer ring and extending radially outwardly into said annular groove; and at least one resilient ring (108) abutting said annular member and engaging said retainer to resiliently support said outer ring within said retainer.

9. An arbor assembly (10) having a spindle (20) journaled for rotation within a tubular bearing outer ring (40) enclosing rolling elements (48) therebetween, a bipartite retainer (42) having first and second oppositely orientated elements (44,46) each having an annular portion (94) at distal ends and a flange portion (68) at proximate ends thereof, said flange portions of said first and second elements being adapted to be secured together to define a bore (69) for receiving said bearing outer ring, wherein the improvement comprises:

said first and second elements (44,46) defining a first annular groove (70) about the inner diameter of the flange portions of said elements;

said bearing outer ring having a second annular groove (72) formed about its periphery;

an annular member (74) retained by said outer ring within said second annular groove and extending radially outward into said first annular groove; and at least one resilient member (108) attached to said annular member and engaging one of said first and second elements to resiliently support said outer ring within said bipartite retainer.

10. An arbor assembly for attachment to a housing comprising:

a spindle (20) adapted to be rotated by a driving element;

a bipartite open ended mount (42) comprising two mounting elements (44,46) having substantially cylindrical openings formed therein and defining a limited annular space (70) therebetween and integral mounting flanges (68) extending radially outwardly from said space;

said flanges being adapted to be assembled adjacent one another to align said openings in said mounting elements along a common axis;

a bearing (36) including multi-row rolling elements and having an outer surface complementary to and supported in said cylindrical openings, said bearing supporting the spindle for its rotation anti-frictionally therein and being axially free;

locater means in said axial space comprising a ring (74) locked at a predetermined selective point on said outer surface of the bearing; and means (66) to clamp said mounting flanges face to face whereby said mounting elements and locater means suspend the bearing at a predetermined fixed location in the assembly with respect to the mount.

11. An arbor assembly for attachment to a housing comprising:

a spindle (20) adapted to be rotated by a driving element;

a bipartite open-ended mount (42) comprising two mounting elements having cylindrical receiving portions with a limited axial space (70) therebetween about the periphery of said cylindrical space and integral mounting flanges (68) extending outwardly from said space so as to be radially disposed in mutual face to face confrontation;

a bearing (36) arranged with at least one row of elements, said bearing having a peripheral surface complementary to said cylindrical receiving portions, said bearing supporting the spindle for its rotation anti-frictionally therein and being accessible from each end;

a ring (74) attached to said outer surface of the bearing and extending radially outward therefrom and having adjacent thereto on at least one side thereof loading ring means (108) of elastomer; and fastener means (66) for clamping said mounting flanges face to face whereby said bipartite mount and elastomer yieldably pre-load the ring and bearing respectively axially and radially in the assembly with respect to the bipartite open ended mount.

12. An arbor assembly for attachment to a housing comprising:

a spindle (20) adapted to be rotated by a driving element;

a bipartite open-ended mount (42) comprising two mounting elements having cylindrical receiving portions with a limited axial space (70) therebetween about the periphery of said cylindrical space and integral mounting flanges (68) extending outwardly from said space so as to be radially disposed in mutual face to face confrontation;

a bearing (36) arranged with at least one row of elements, said bearing having a peripheral surface complementary to said cylindrical receiving portions, said bearing supporting the spindle for its rotation anti-frictionally therein and being accessible from each end;

first and second axially spaced elastomeric annuli (108,110) disposed on opposite sides of a rigid ring (74) being retained in preloaded condition within said axial space, said ring being locked to said outer surface of the bearing; and means (66) to clamp said mounting flanges face to face whereby said bipartite open ended mount and included elastomeric annuli yieldably preload the ring (74) and bearing respectively axially and radially in the assembly with respect to the mount so as to be free to readily absorb undue axial shock stress with freedom from looseness developing in the assembly under ordinary vibrational stress.

* * * * *